April 15, 1969  H. A. OHLGREN  3,438,729
PREPARATION OF FINELY DIVIDED CRYSTALLINE METAL CARBIDES
Filed July 16, 1965  Sheet 1 of 2

INVENTOR
HAROLD A. OHLGREN

BY Olsen and Stephenson
ATTORNEYS

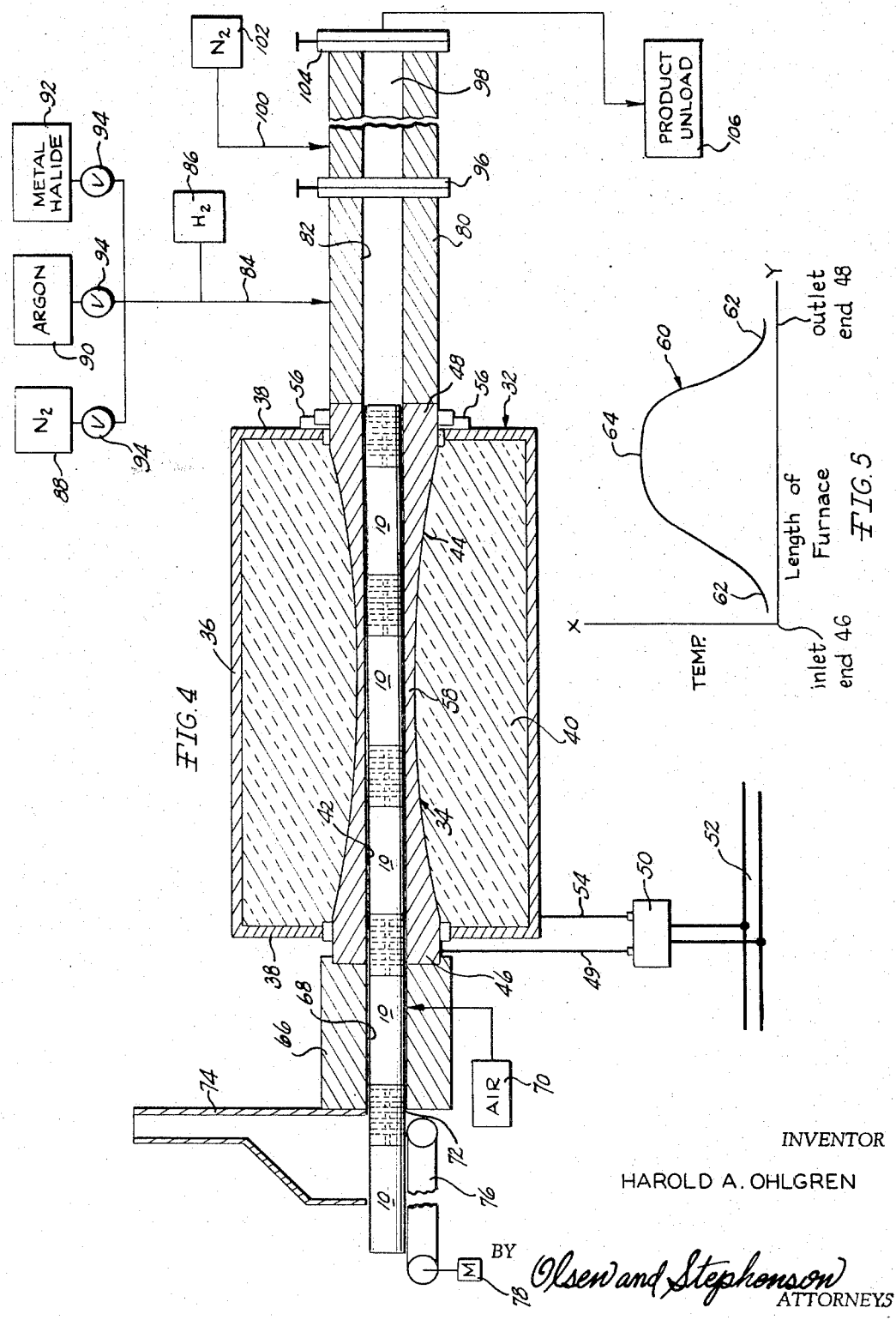

United States Patent Office 3,438,729
Patented Apr. 15, 1969

3,438,729
PREPARATION OF FINELY DIVIDED CRYSTALLINE METAL CARBIDES
Harold A. Ohlgren, 2920 Overridge Drive,
Ann Arbor, Mich. 48104
Filed July 16, 1965, Ser. No. 472,469
Int. Cl. C01b 31/36
U.S. Cl. 23—208          4 Claims

ABSTRACT OF THE DISCLOSURE

A process for manufacturing metal carbides which are used principally as abrasive grits and abrasive structures wherein raw material mixtures are subjected to controlled temperature and time conditions causing rapid chemical reaction rates and nucleation of the raw materials promoting the formation of the uniform microcrystallites of metal carbides.

---

This invention relates generally to the field of metal carbides which are used principally as abrasive grits and abrasive structures, and more particularly to an improved carbide crystal and a method and apparatus for manufacturing such crystals.

Conventional methods for manufacturing carbides involve the reaction of raw materials under conditions whereby crystal formation and growth cannot be controlled within desired limits of crystal size. Consequently, in order to convert such crystals for specific product use, single whole crystals are fractured into bits and subsequently incorporated in an abrasive structure. The resulting crystal particles not only have poor edges for cutting and grinding but have internal stresses which seriously limit the strength of the particles and thus the life and capabilities of the abrasive products formed from the particles. It is an object of this invention, therefore, to provide improved whole crystals in which the edges of the crystals can be utilized as the cutting edges in an abrasive product, and an improved process for producing such crystals in which selected raw materials are processed under controlled conditions such that microcrystallite nucleates are formed and subsequently caused to grow to specified single crystal sizes, and improved apparatus for carrying out the process so as to produce carbide crystals under controllable conditions at an economical cost.

Another object of this invention is to provide an improved method and apparatus for forming silicon carbide, titanium carbide, and silicon-titanium binary carbide systems.

According to this invention, a raw material mixture consisting of the metal desired in the final carbide product, carbon, and carbonaceous material such as sawdust, are intimately mixed and loaded into novel crucibles. Carbide seeds can also be added to the mixture since the presence of the seeds promotes the reaction of the metal and carbon and provides for the manufacture of larger crystals from the seeds. The raw material components are proportioned so that substantially stoichiometric quantities of metal in pure or compound form, and carbon are placed in each crucible. The oxide of the metal is usually used as the raw material, but the addition thereto of powders of the pure metal speeds up the subsequent chemical reaction. The crucibles are then moved at a predetermined speed through the resistance furnace of this invention in a continuous process. In order to obtain whole crystals of desirable size, each raw material mixture must be heated for a predetermined time period, determined at least in part by the quantity of material involved, to a maximum temperature of at least 3700° F., although it is believed that product can be obtained at temperatures as low as about 2300° F. but in such cases heating for inordinately long time periods is required. The furnace is structured to provide for subjecting of the raw material to a continuously changing heat flux with this continuous change being according to a predetermined pattern. This pattern is such that the temperature of the raw material of the raw material mixture is gradually raised and subsequently gradually lowered such that when the temperature of the raw material mixture is plotted on the X axis against the time of heating of the mixture in the furnace on the Y axis, the resulting curve approximates a positive half wave sine curve and more closely approximates a positive half wave Bessel function curve of zero order which is in itself substantially a positive half wave sine curve. By varying the temperature at the top of the temperature curve and the maximum energy input virtually all of the raw material is converted to single microcrystallites of carbide, and by varying the decreasing energy flux and temperature curve downwardly from the top of the curve, the desired size range of the carbide crystals produced is controlled to thereby obtain the desired final product. Furthermore, carbide crystals produced according to the method of this invention have improved strength and temperature resistant qualities and can be produced in the cubic shape and rhombohedron size which latter length is particularly advantageous because of the increased length of the cutting edges of the crystal.

Further objects, features and advantages of this invention will become apparent from a consideration of the following description, the appended claims, and the accompanying drawing in which:

FIGURE 4 is a longitudinal sectional view of the furnace structure of this invention, illustrating crucibles of this invention disposed therein.

Figure 1:
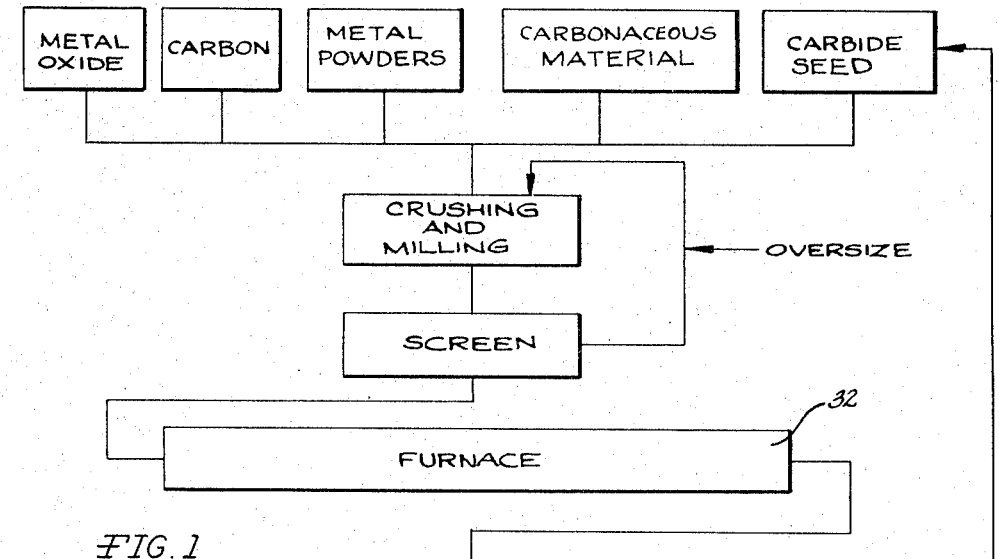
FIGURE 1 is a schematic diagram illustrating the process of this invention.

With reference to the drawing, the method of this invention is illustrated diagrammatically in FIG. 1 as utilizing a raw material mixture consisting of a metal oxide, carbon, sawdust, and a carbide seed, plus a powder of the metal if desired. When the desired final product is silicon carbide, any silicon bearing material can be used although the metal oxide, such as Ottawa sand containing 96+% $SiO_2$, is preferred because it is inexpensive and readily breaks down into silicon and oxygen. When the final desired product is titanium carbide, the preferred material is $TiO_2$, and when a silicon-titanium binary is desired, the sand and $TiO_2$ are mixed. As the terms "metal" and "metal oxide" are used herein, they are inclusive of "silicon," "titanium" and "silicon dioxide," "titanium dioxide," respectively, since silicon and titanium are sometimes classified as metals. The carbon material may be either raw fluid coke spheres, uncalcined coke particles, or carbon black. The carbonaceous raw material is preferably ordinary finely divided wood sawdust and the carbide seed consists of carbide crystals, the chemical composition of which corresponds to the desired carbide product to be formed. Generally, fines from the final product in a previous furnace cycle are used as seed, since some of these fines grow to more desirable sizes in subsequent furnace cycles. The carbide seed speeds up the nucleation of new crystals and is therefore a desirable addition to the mixture, although it can be omitted, as shown in Examples 1, 2 and 3 set forth hereinafter. These raw materials are crushed and milled to a finely divided condition, passed through screens to screen out the oversize material, which is then recrushed and milled. The simultaneous feeding of all of the raw materials into the crushing and milling apparatus accomplishes an intimate mixing of the raw materials during the crushing and milling step, which is continued until all of the final raw material particles are preferably in a size range of 0.4–250 microns measured across their largest dimension.

Figure 2:
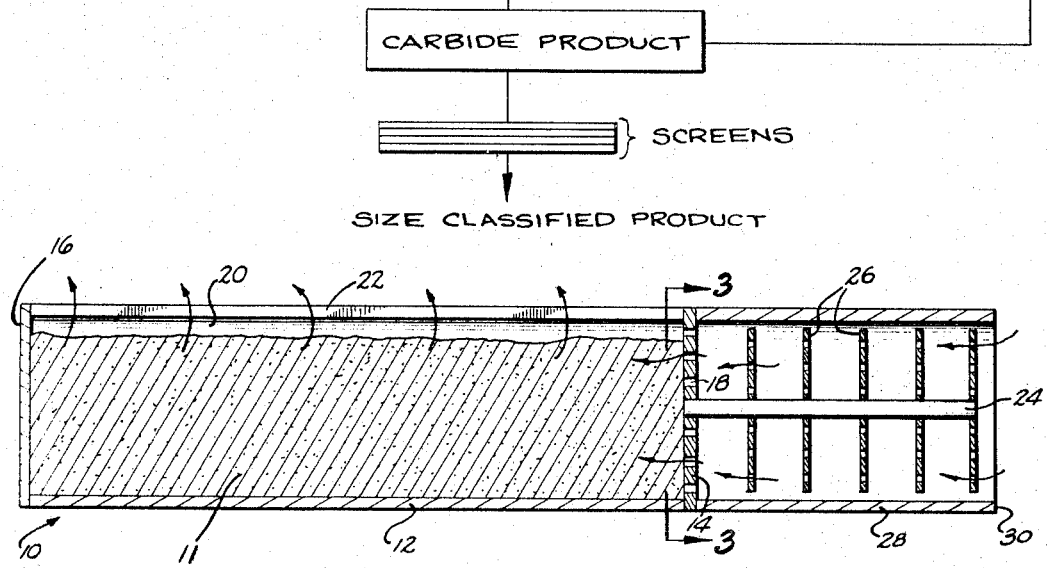
FIGURE 2 is a longitudinal sectional view of the crucible of this invention.
Figure 3:
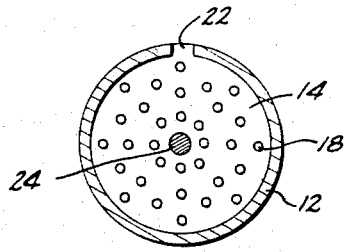
FIGURE 3 is a transverse sectional view of the crucible of this invention, looking substantially along the line 3—3 in FIG. 2.

The finely divided intimately mixed raw material mixture is then loaded into crucibles 10, the details of which are illustrated in FIGS. 2 and 3. A crucible 10 consists of a refractory body 12, preferably graphite, which is of generally tubular shape, as illustrated in FIG. 3, having a front end wall 14 and a rear end wall 16. As shown in FIG. 2, the front wall 14 is provided with openings 18 which form gas inlet openings to the chamber 20 formed inside the crucible body 12. The rear end wall 16 is imperforate. On its top side, body 12 is formed with an elongated slot 22 which consitutes a filling and loading opening for the chamber 20 and also functions as an outlet for gases from the chamber 20. A support rod 24 is secured to and extends forwardly from the body front wall 14. The rod 24 is preferably formed of graphite and supports a plurality of disks 26, spaced lengthwise of the rod 24. The disks 26 are perforated and are preferably formed from a carbon cloth since they function as radiation shields to prevent loss of heat from the chamber 20. A graphite tube 28 is also secured to and extends forwardly from the crucible front wall 14 so that it surrounds the disks 26 and the rod 24. The tube 28 constitutes an additional radiation shield for chamber 20 and in addition functions as a bumper, with the front end 30 of the tube 28 engaging the rear wall 16 of the adjacent crucible 10 so as to push it through the furnace of this invention, as is more fully described hereinafter.

Following filling of the crucibles 10 with the raw material mixture, indicated generally at 11 in FIG. 2, the crucibles 10 are loaded into a furnace 32 (FIGS. 1 and 4). The furnace 32 consists of an elongated tube 34 formed of a refractory material that will also conduct electric current, preferably graphite, which is surrounded by a shell 36 formed of a good current conducting material such as copper, and having end walls 38. The space between the shell 36 and the tube 34 is filled with an insulation material 40, preferably carbon black. As shown in FIG. 4, the tube 34 is shaped so that it has an inner surface of constant diameter which forms a continuous furnace passage 42 of uniform size extending lengthwise through the tube 34. The tube 34 is shaped at its outer surface 44 so that it is of a continuously varying cross sectional size along its length from its inlet end portion 46 to its outlet end portion 48. As a result, the electrical resistance of portions of the tube 34 is different, with the resistance being a maximum at approximately the center section 58 of the tube and a minimum at the tube ends. At the inlet portion 46 of the tube 34, the tube 34 is connected by a lead 49 to a step down transformer 50 which is connected to a source of single phase alternating current supply 52. A lead 54 connects the transformer 50 to the copper shell 36 at the inlet portion 46 of resistance tube 34 and conductors 56 connect shell 36 to the outlet end portion 48 of the tube 34. As a result, on supply of current to the transformer 50, the tube 34 constitutes a variable resistance in a circuit which includes shell 36 so that the tube 34 is heated to an extent proportioned to the magnitude of the power supply, with the heat at each portion of the tube 34 being proportional to the cross sectional size of the tube 34. As shown in FIG. 4, the tube 34 is of a progressively decreasing cross sectional size from its inlet end portion 46 to its center portion 58. From its center portion 58 to its outlet end portion 48, the tube 34 is of a constantly increasing cross sectional size.

The shape of the outer surface 44 of the resistance tube 34 is important in the furnace 32 because this shape defines the temperature profile to which the raw material mixture 11 travelling through the furnace passage 42 is subjected. The outer surface 44 is shaped to provide a temperature profile or curve approximating the curve shown in FIG. 5 at 60. As illustrated in FIG. 5, when the temperature inside the furnace passage 42, and thus the temperature of the mixture 11 travelling therethrough is plotted on the X axis against the length of the tube 34 commencing at the inlet end portion 46 on the Y axis, the curve 60 approximates the positive half wave sine curve, and more closely approximates a Bessel function curve in which the end portions of the curve 62 are flattened because of the relatively constant cross sectional size of the end portions 46 and 48 of the furnace tube 34 and the intermediate portion 64 of the curve 60 is also somewhat flattened.

A combustion chamber tube 66 is connected to the inlet end portion 46 of the furnace tube 34 so that the combustion chamber passage 68 in the tube 66 is of the same size and is axially aligned with the furnace passage 42. A supply of combustion air 70 is provided for the combustion chamber passage 68 which is connected at its inlet end 72 to an exhaust stack 74. A conveyor 76, illustrated as being driven by a motor 78, is positioned at the inlet end 72 of the combustion chamber 68 for moving crucibles 10 into the combustion chamber passage 68.

A tubular cooling chamber member 80 is connected to the outlet end portion 48 of the furnace tube 34 so that an internal passage 82 in the cooling chamber member 80 is aligned with the furnace passage 42. A gas inlet line 84 communicates with the cooling chamber member 80 and is connected to a supply of hydrogen 86. The line 84 also connects with a nitrogen supply 88, an argon supply 90, and a metal halide supply 92. Each of these supplies is associated with a valve 94 so that these gasses can be supplied to the cooling chamber 80 as desired.

The outlet end of the cooling chamber 80 communicates with a gate 96 which blocks communication of the cooling chamber 80 with an auxiliary cooling chamber 98, connected through a line 100 to a supply of nitrogen 102. The outlet end of the auxiliary cooling chamber 98 is closed by a gate 104 from which cooled crucibles 10 are removed and transported to a product unload station indicated generally at 106.

In the operation of the furnace 32 of this invention, according to the method of this invention, crucibles 10 loaded with raw material heretofore described, are placed on the conveyor 76 which moves the crucibles into the combustion chamber passage 68. Successive crucibles 10 are placed on the conveyor 76 so that the front end 30 of each crucible engages the rear wall 16 of the crucible previously moved into the combustion chamber passage 68. By continuously placing crucibles 10 on the conveyor 76, each crucible is progressively moved through the combustion chamber passage 68, the furnace passage 42, the cooling chamber passage 82, and the auxiliary cooling chamber 98. The raw material mixture 11, including preferably substantially stoichiometric proportions of metal and carbon, in each crucible 10 is heated in the furnace passage 42 to cause a chemical reaction in which the metal from the metal oxide combines with the carbon to form the carbide product. In a preferred embodiment of the invention, raw material mixtures proportioned by weight according to substantially the following ranges are used: (1) $TiO_2$ 65–75%, coke 25–35%, carbon black and sawdust 3–4%; and (2) sand 60–65%, coke 30–35%, sawdust 3–5%. Hydrogen from the source 86 flows through the furnace passage 42 in a direction opposite to the direction of movement of the crucible 10, and either nitrogen from the source 88 or argon from the source 90 are also admitted through the line 84 to the furnace passage 42. In the furnace passage 42, the hydrogen becomes nascent, which is very desirable because the nascent hydrogen is highly reactive.

In some cases nitrogen is utilized since it cooperates with the silicon to form a silicon nitride film on the carbide crystals which subsequently facilitates bonding of the crystals. When this silicon nitride film is not desired, because of the final end purpose to which the carbide crystals are to be put, argon is used. In some cases, the metal halide 92 utilized is silicon tetrachloride and in other cases titanium tetrachloride since the tetrachloride disassociates into the metal and nascent chlorine, which is a desirable gas in the raw material mix because it is highly reactive. The metal reacts with the carbon in the crucible 10 to form additional crystals and the chlorine reacts with the ash to form an ash chloride which leaves the crucible in the form of a gas. When a tetrachloride is introduced, carbide in the form of single filament fibers is produced in addition to the crystals. These fibers have extremely high break strengths and are therefore advantageous when incorporated in some abrasive structures, such as abrasive which, because in addition to functioning as an abrasive they add strength to the wheel.

In any event, the gases admitted to the chamber 82 through the line 84 flow countercurrent to the direction of travel of the crucibles 10 and flow into each crucible through the shields 26 and the crucible openings 18 into the product so as to fully fluidize the mixture in the crucible chamber 20. In other words, these gases flow into the crucible chamber through the openings 18, fluidize the mixture in the chamber 20, and flow out of the chamber 20, along with carbon monoxide liberated from mixture 11, through the upper opening 22 for subsequent fluidizing flow into the next crucible 10 through the openings 18. All of the admitted gases which flow into the combustion chamber passage 68, and volatile gases produced from the chemical reactions are combusted in said chamber.

The sawdust in each crucible, when heated, breaks down into carbon and nascent hydrogen. This nascent hydrogen promotes the rate of reaction of metal and carbon in the crucible 10 because it produces metal hydrides which are highly reactive and in addition promotes the degree of fluidization of the raw material mixture which is essential to the forming of the desired carbide crystals. As each crucible 10 moves toward the center portion 58 of the furnace tube 34, the temperature of the mixture in the crucible 10 is subjected to a continuously changing heat energy input causing a chemical reaction in each crucible resulting in the formation of carbide microcrystallites. It is essential that the mixture be heated to a temperature of at least 2300° F. in order to form the carbide crystals. It is preferred to heat the mixture to a temperature considerably above the 2300° F. range because the higher temperature speeds up the reaction rate as an exponential function of temperature. In the range of temperatures between 3000° F. and 3750° F. single whole beta phase carbide crystals are formed which are cubic in shape and green in color. Above 3750° F. single whole alpha phase crystals of hexagonal and rhombohedral shape are formed and it has been found that the prevalent shape when the temperature is raised at the center section 58 of the furnace tube 34 to a temperature in the 3750° F. to 4750° F. is a rhombohedral crystal. Such a crystal is particularly advantageous and desirable because of the long cutting edges formed on each crystal. Thus, by varying the electrical input to the furnace tube 34 so as to vary the rate of energy input and the extent of energy input to the raw material mixture in each crucible 10 the rate at which crystals are formed in the increasing temperature section of furnace tube 34 between inlet end 46 and center 58 can be predetermined, and the size of the carbide crystals obtained can be predetermined by the residence time of the product in the declining heat flux area of furnace 32 between center 58 and outlet end 48.

As the material in each crucible reaches temperatures in the range of 1200° F. to 2000° F. the sawdust in the mixture rapidly carbonizes to form gases, namely, hydrocarbons, as well as alcohols, aldehydes, and ketones, which promotes fluidization of the metal oxide and coke particles in the mixture. In the temperature range from 1500° F. to 3000° F., the carbon particles liberate hydrogen and methane gas which also contribute to fluidization. As the hydrogen concentration in the gas flowing through each crucible chamber 20 increases, the metal oxide particles are reduced in part to an active metal which promptly reacts with the carbon in the chamber to form nucleates of microcrystalline metal carbide. The metal carbide seeds in mixture 11 start chain reactions which promote the growth of these microcrystallites. When the temperature in the furnace passage 42 is raised to above 4500–4700° F., the carbide seeds sublime to promote this chain reaction. Some of the seeds break down while others grow to the larger desirable sizes in some cases. During travel of a crucible from the center furnace section 58 to the outlet end section 48, the rate of energy input into the mixture is decreasing, and it is during this time that the microcrystallites grow, dependent on time, to single crystals of predetermined size. These crystals fall into classifications from 4 to 1200 grit number depending on the time of the microcrystallites in the declining heat zone of furnace 32.

The time the raw material is left in the furnace tube 34 is dependent in part on the magnitude of the mass of the material in each crucible 10. In other words, the basic requirement is uniform heating of the raw material, and the extent of the mass affects this requirement because the outer layers insulate the inner portions. Another advantage of the carbide seed in the mix is its ability to promote heat transfer in the mixture. The fluidization of the mixture also promotes this heat transfer and prevents the agglomeration of multiple crystals. In cases where finely divided high grit number abrasives are required, the rate of movement of the crucibles is increased so that the energy absorption per pound of product obtained is from 3.0 to 3.75 kilowatts of electrical energy. When it is desired to produce large single crystals from 4 to 60 grit number, the rate of travel of the crucibles through the furnace passage 42 is slowed down.

The following specific examples will serve to illustrate the invention but they are not to be considered limiting:

Example No. 1

The raw material mixture, consisting of particles in the 10 to 250 micron range, is as follows:

|  | Percent | Lbs. |
| --- | --- | --- |
| Ottawa sand | 62.7 | 60 |
| Raw fluid coke spheres | 34.2 | 33 |
| Sawdust | 3.1 | 3 |
|  | 100.0 | 96 |

The temperature of the furnace 32 at locations measured in inches from the inlet end 46 is as follows.

Distance, in.: Temp., ° F.
  0 (inlet 46) _____ 120
  12 _____ 525
  18 _____ 910
  24 _____ 1640
  30 _____ 2610
  36 _____ 3140
  42 _____ 3700
  48 _____ 3850
  54 (center 58) _____ 3910
  60 _____ 3900
  72 _____ 3835
  78 _____ 3640
  84 _____ 3300
  90 _____ 2940
  96 _____ 2200
  108 (outlet 48) _____ 1500
  Cooler (chamber 82) _____ 540

The power used is 60 kilowatts (6000 amps, 10 volts) and 34 lbs. of mixture was loaded into each crucible 10. Each crucible is moved through the furnace tube 34 at a rate of about 5″ to 6″ per hour. Hydrogen and argon from supplies 86 and 90 are flowed through furnace passage 42.

The resulting product is more than 80% single whole crystals (beta phase, green, cubic in shape) falling in the grit number range termed number 60 and having a hardness of 1900–2300 measured on the Knoop scale. Such a product is useful as a lapping compound, honing compound and various grades of grinding wheel grits.

Example No. 2

The product mixture, consisting of particles in the 10–250 micron range, is as follows:

|  | Percent | Lbs. |
|---|---|---|
| Ottawa sand | 62.7 | 60 |
| Uncalcined coke flour | 34.2 | 33 |
| Sawdust | 3.1 | 3 |
|  | 100.0 | 96 |

The product mixture was subjected to the following temperatures in the furnace tube 34 measured at points in inches from the inlet end 46 of the tube 34 as follows.

Distance, in.: Temp., ° F.
- 0 (inlet 46) _____ 250
- 12 _____ 600
- 18 _____ 1200
- 24 _____ 1910
- 30 _____ 2815
- 36 _____ 3640
- 42 _____ 4210
- 48 _____ 4600
- 54 (center 58) _____ 4735
- 60 _____ 4610
- 72 _____ 4450
- 78 _____ 4200
- 84 _____ 3600
- 90 _____ 3100
- 96 _____ 2400
- 108 (outlet 48) _____ 1900
- Cooler (chamber 82) _____ 635

The power used is 60 kilowatts (6000 amps, 10-volts) and 28.5 lbs. of raw material is loaded into each crucible 10. Crucibles are moved through the furnace passage 42 at a rate of about 7″ to 8″ per hour.

At the initial startup, nitrogen gas, from supply 88, is caused to flow countercurrent to the flow of the crucibles in the passage 42. As the temperature of the reactants ranged from 3750° F. to 4600° F. the nucleated green silicon carbide microcrystallites transforme to the alpha phase, forming nucleates of microcrystals of hexagonal shape. In the temperature range from 4600° F. to 3100° F., in the portion of the furnace passage 42 between the mid point 58 and the outlet end section 48, the nucleated silicon carbide microcrystallites continue to grow to predetermined size falling into grit number classification from 46 to 600 grit number.

Stoichiometric amounts of carbon and silicon are used when conventional silicon carbide is desired. When a ceramic type of silicon carbide is desired, a carbon deficient system is employed, and when an excess of carbon is used the resulting crystals have a certain amount of lubricity which is desirable in certain grinding wheel applications.

Example No. 3

The product mixture, consisting of particles in the 0.4 to 10 micron range, is as follows:

|  | Percent | Lbs. |
|---|---|---|
| TiO₂ | 69.4 | 80.0 |
| Calcined coke | 27.5 | 32.4 |
| Carbon black and sawdust | 3.1 | 3.6 |
|  | 100.0 | 116.0 |

The temperature profile in the mixture as it moved through the furnace passage 42 was as follows:

Distance, in.: Temp., ° F.
- 0 (inlet 46) _____ 300
- 12 _____ 800
- 18 _____ 1040
- 24 _____ 1675
- 30 _____ 2810
- 36 _____ 3940
- 42 _____ 4650
- 48 _____ 5230
- 54 (center 58) _____ 5510
- 60 _____ 5400
- 72 _____ 5115
- 78 _____ 4640
- 84 _____ 4270
- 90 _____ 3400
- 96 _____ 2600
- 108 (outlet 48) _____ 2100
- Cooler (chamber 82) _____ 900

The power is the same as in Examples 1 and 2 and 23.5 lbs. of raw material is loaded into each crucible. Each crucible is moved at a rate of about 7″ to 8″ per hour through the furnace passage 42.

To assure a highly purified environment for the product, argon from source 90 is flowed countercurrent to the travel of the crucibles through the furnace passage 42.

Pure titanium carbide single crystals are obtained having a hardness in the range of 2600–2800 measured on the Knoop scale.

Example No. 4

The following raw material mixture is used:

|  | Percent | Lbs. |
|---|---|---|
| Ottawa sand | 28.0 | 30 |
| TiO₂ | 36.00 | 40 |
| Calcined coke flour | 32.25 | 33 |
| Carbon black and sawdust | 2.80 | 3 |
| Seed (SiC-TiC) | .95 | 1 |
|  | 100.0 | 107 |

The furnace temperature profile is as follows:

Distance, in.: Temp., ° F.
- 0 (inlet 46) _____ 250
- 12 _____ 630
- 18 _____ 1120
- 24 _____ 1940
- 30 _____ 2625
- 36 _____ 3100
- 42 _____ 3725
- 48 _____ 3900
- 54 (center 58) _____ 4185
- 60 _____ 4005
- 72 _____ 3760
- 78 _____ 3440
- 84 _____ 2875
- 90 _____ 2130
- 96 _____ 1790
- 108 (outlet 48) _____ 1200
- Cooler (chamber 82) _____ 650

The power used is the same as in Examples 1 and 2 and 36 lbs. of product are loaded into each crucible 10. Each crucible is moved through the furnace passage 42 at a rate of about 6″ to 7″ per hour.

Crystals of improved hardness and cutting edge characteristics are obtainable according to this example. Binary (SiC-TiC) cubic crystals are obtained having a hardness ing the 2000–2800 range on the Knoop Scale.

From the above description it is seen that this invention provides improved metal carbides which are produced according to an improved process wherein time, temperature and environmental conditions are controlled to achieve predictable products. These conditions, employing the apparatus of this invention cause raw materials to convert to crystal nucleates which subsequently grow to single whole crystals of predetermined size, shape and chemical composition. The gaseous products from furnace passage 42 burn in combusion chamber passage 68, in the presence of air from source 70, and the resulting products of combination flow out through exhaust stack 74. This arrangement provides for pre-heating of the mixture 11 in each crucible while the crucible is in combustion chamber passage 68.

It will be understood that the carbide crystal and method and apparatus for manufacturing same which are herein disclosed and described are presented for purposes of explanation and illustration and are not intended to indicate limits of the invention, the scope of which is defined by the following claims.

What is claimed is:

1. In a process for preparing titanium carbide crystals, the steps comprising:
    (a) providing particles of $TiO_2$;
    (b) providing particles of coke;
    (c) mixing said $TiO_2$ and coke particles with carbon black and sawdust to provide a mixture proportional by weight according to substantially the following ranges:

| | Percent |
    |---|---|
    | $TiO_2$ | 65–75 |
    | Coke | 25–35 |
    | Carbon black and sawdust | 3–4 |

(d) adding titanium carbide crystals to said mixture in an amount such that said crystals constitute the smallest proportion of said mixture;
    (e) continuously moving said mixture in one direction through a variable temperature heat zone in which the temperatures are such that as said mixture is moved therethrough it is heated for a time period of at least eight hours according to a predetermined pattern so as to gradually raise and then lower the temperature of said mixture so that the maximum temperature to which said mixture is subjected is at least 2300° F.;
    (f) flowing hydrogen through said heat zone and through said mixture so as to fluidize the mixture and in a direction opposite to said one direction; and
    (g) cooling said mixture to room temperature.

2. In a process for preparing titanium carbide crystals, the steps comprising:
    (a) providing particles of $TiO_2$ of a size in the 0.4–10 micron range;
    (b) providing particles of coke of a size in the 0.4–10 micron range;
    (c) mixing said $TiO_2$ and coke particles with carbon black and sawdust to provide a mixture proportional by weight according to substantially the following ranges:

| | Percent |
    |---|---|
    | $TiO_2$ | 65–75 |
    | Coke | 25–35 |
    | Carbon black and sawdust | 3–4 |

(d) adding titanium carbide crystals to said mixture in an amount such that said crystals constitute the smallest proportion of said mixture;
    (e) continuously moving said mixture in one direction through a variable temperature heat zone in which the temperatures are such that as said mixture is moved therethrough it is heated for a time period of at least eight hours according to a predetermined pattern so as to gradually raise and then lower the temperature of said mixture such that when the temperature of said mixture is plotted on the X axis against the time of heating of said mixture on the Y axis the resulting curve approximates a positive half period sine curve in which the maximum temperature is at least 2300° F.;
    (f) flowing hydrogen through said heat zone and through said mixture so as to fluidize the mixture and in a direction opposite to said one direction; and
    (g) cooling said mixture to room temperature.

3. In a process for preparing silicon carbide crystals, the steps comprising:
    (a) providing particles of sand;
    (b) providing particles of coke;
    (c) mixing said sand and coke particles with sawdust to provide a mixture proportional by weight according to substantially the following ranges:

| | Percent |
    |---|---|
    | Sand | 60–65 |
    | Coke | 30–35 |
    | Sawdust | 3–5 |

(d) adding silicon carbide crystals to said mixture in an amount such that said crystals constitute the smallest proportion of said mixture;
    (e) continuously moving said mixture in one direction through a variable temperature heat zone in which the temperatures are such that as said mixture is moved therethrough it is heated for a time period of at least eight hours according to a predetermined pattern so as to gradually raise and then gradually lower the temperature of said mixture and so that the maximum temperature to which said mixture is subjected is at least 3700° F.;
    (f) flowing hydrogen through said heat zone and through said mixture so as to fluidize the mixture and in a direction opposite to said one direction; and
    (g) cooling said mixture to room temperature.

4. In a process for preparing silicon carbide crystals, the steps comprising:
    (a) providing particles of sand of a size sufficiently small to pass through a —100 mesh screen;
    (b) providing substantially spherical particles of coke of a size sufficiently small to pass through a —50 mesh screen;
    (c) mixing said sand and coke particles with sawdust to provide a mixture proportional by weight according to substantially the following ranges:

| | Percent |
    |---|---|
    | Sand | 60–65 |
    | Coke | 30–35 |
    | Sawdust | 3–5 |

(d) adding silicon carbide crystals to said mixture in an amount such that said crystals constitute the smallest proportion of said mixture;
    (e) continuously moving said mixture in one direction through a variable temperature heat zone in which the temperatures are such that as said mixture is moved therethrough it is heated for a time period of at least eight hours according to a predetermined pattern so as to gradually raise and then gradually lower the temperature of said mixture such that when the temperature of said mixture is plotted on the X axis against the time of heating of said mixture on the Y axis the resulting curve approximates a positive half period sine curve in which the maximum temperature is at least 3700° F.;
    (f) flowing hydrogen through said heat zone and through said mixture so as to fluidize the mixture and in a direction opposite to said one direction; and
    (g) cooling said mixture to room temperature.

References Cited

UNITED STATES PATENTS

| | | |
|---|---|---|
| 2,178,773 | 11/1939 | Benner et al. |
| 2,913,313 | 11/1959 | Schroll. |
| 3,174,827 | 3/1965 | Wakelyn et al. |
| 3,205,042 | 9/1965 | Jacobson. |
| 3,334,967 | 8/1967 | Bourdeau. |
| 3,346,678 | 10/1967 | Ohlgren. |
| 3,348,915 | 10/1967 | Watson et al. |

(Other references on following page)

FOREIGN PATENTS 967,933   8/1964   Great Britain.

OTHER REFERENCES

Handbook of Chemistry and Physics, 36th ed., Chemical Rubber Publishing Co., 1955, p. 1983.

O'Connor et al.: Silicon Carbide, Pergamon Press, New York, 1960, pp. 45 and 46, TK 7872 S4C48.

Schwarzkopf et al.: Refractory Hard Metals, MacMillan Co., New York, 1953, p. 86, TN 677 S36.

OSCAR R. VERTIZ, *Primary Examiner.*

G. J. OZAKI, *Assistant Examiner.*

U.S. Cl. X.R.

106—44